H. GALE & W. B. ROMEISER,
SEPARABLE RIM.
APPLICATION FILED JAN. 11, 1916.
1,241,107.
Patented Sept. 25, 1917.
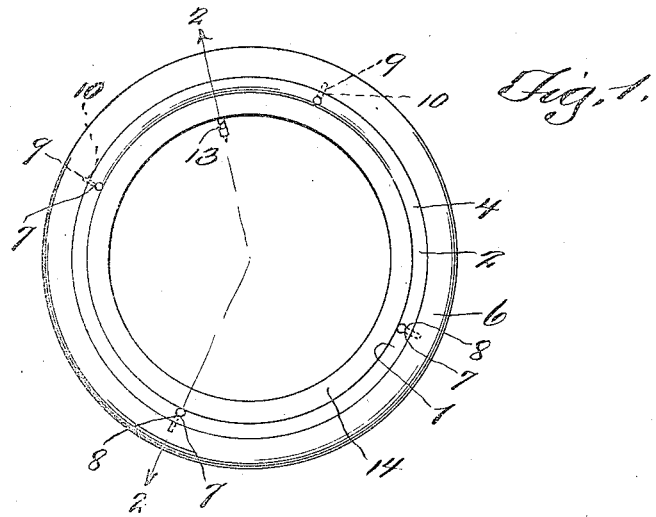
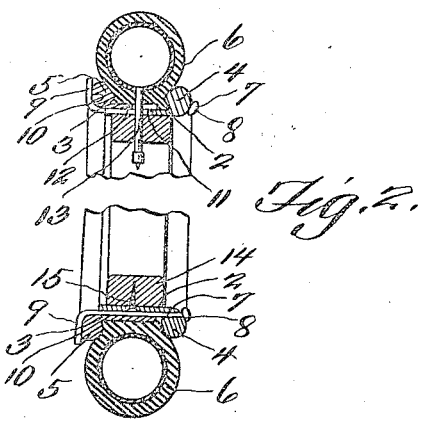
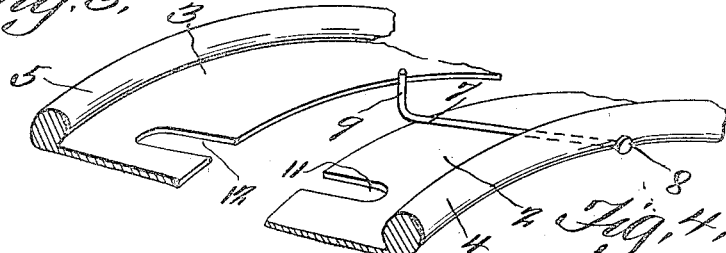
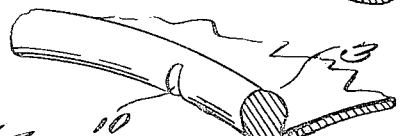
Witnesses
Inventor
Henry Gale
William B. Romeiser
By
Their Attorneys

UNITED STATES PATENT OFFICE.

HENRY GALE AND WILLIAM B. ROMEISER, OF TIMKEN, KANSAS.

SEPARABLE RIM.

1,241,107.

Specification of Letters Patent. Patented Sept. 25, 1917.

Application filed January 11, 1916. Serial No. 71,496.

*To all whom it may concern:*

Be it known that we, HENRY GALE and WILLIAM B. ROMEISER, citizens of the United States, residing at Timken, in the county of Rush, State of Kansas, have invented a new and useful Separable Rim; and we do hereby declare the following to be a full, clear, and exact description of the invention, such as will enable others skilled in the art to which it appertains to make and use the same.

This invention relates to an improved demountable rim for vehicle wheels, and one of the objects of the invention is to provide a rim consisting of two overlapping rim sections, in combination with transversely disposed pins, each having a head on one end, and an angled portion at the opposite end for detachably holding the rim sections overlapped.

Another object of the invention is to provide notches upon the edge of one of the rims to receive said angle portions, to prevent partial rotation of the pins.

Another object of the invention is the provision of a slot and pin connection between the two rim sections, whereby as one rim section is telescoped into the opposite rim section, the retaining pins will be alined with the notches, so that the notches will receive the angle or bent portions of the retaining pins.

In practical fields the details of construction may necessitate alterations, falling within the scope of what is claimed.

The invention comprises further features and combinations of parts, as hereinafter set forth, shown in the drawings and claimed.

In the drawings:

Figure 1 is a view in side elevation of the improved demountable rim.

Fig. 2 is a sectional view on line 2—2 of Fig. 1.

Fig. 3 is a detail perspective view of a portion of one of the sections which carries the retaining pins.

Fig. 4 is a detail perspective view of a portion of the opposite section, in a position ready to be telescopically united to the opposing section.

Referring more especially to the drawings, 1 designates the rim as a whole, which comprises the two rim sections 2 and 3, which are provided with annular beads 4 and 5, which, when the rim sections are telescopically united, engage the opposite sides of the tire 6, thereby holding the same securely in position. Retaining pins 7 extend transversely of the bead 4 of the rim section 2, and are arranged at spaced intervals. The retaining pins 7 are provided with heads 8 to prevent movement of the pins in one direction. When the rim sections are telescopically united, the retaining pins engage between the rim sections. Each retaining pin at its end opposite the head is provided with an angular bent portion 9, adapted to overlie the bead 5 of the rim section 3, owing to the pin being rocked partially and engage a notch 10 of the bead 5. These notches 10 are arranged at spaced intervals, and are for the purpose of preventing displacement of the retaining pins, and also assist in preventing annular movement of one rim section relative to the other rim section. The rim section 2 is supplied with a transverse slot 11, which, when the rim sections are telescopically united, registers with a slot 12 of the rim section 3, so that in this manner the two slots will arch the inflating check valve casing 13 of the tire. The check valve casing in conjunction with the slots will also assist in preventing creeping of one rim section relative to the other. The rim section 2 is secured upon the felly 14 of the wheel by means of the devices 15. From the foregoing it is to be noted that there has been devised an improved rim for vehicle wheels, and one which has been found simple, efficient and practical in construction, and which may be removed or attached very easily and quickly.

The invention having been set forth, what is claimed as new and useful is:

In a separable rim, a pair of rim sections consisting of thin bands, one overlapping the other a distance substantially the width of the rim, the outer edges of said band rim sections having annular beads, the underlapping band rim section having its bead provided with a plurality of openings, the bead of the overlapping band rim section having radially disposed recesses, a plurality of pins passing through said openings, whereby the shanks of the pins pass between the band rim sections, the extremities of the pins being bent radially and into engagement with the recesses of the bead of the overlapping rim section, whereby axial and rotatable displacements of said pins are prevented.

In testimony whereof we have signed our names to this specification in the presence of two subscribing witnesses.

HENRY GALE.
WILLIAM B. ROMEISER.

Witnesses:
 WM. HOLOPIREK,
 CHARLES B. LEWIS.